United States Patent
Vasko et al.

(10) Patent No.: US 10,547,666 B2
(45) Date of Patent: Jan. 28, 2020

(54) SYSTEMS AND METHODS FOR EXCHANGING INFORMATION BETWEEN DEVICES IN AN INDUSTRIAL AUTOMATION ENVIRONMENT

(71) Applicant: Rockwell Automation Technologies, Inc., Mayfield Heights, OH (US)

(72) Inventors: David A. Vasko, Hartland, WI (US); Kelly A. Michalscheck, Racine, WI (US); Kyle K. Reissner, Hudson, OH (US); Jimi R. Michalscheck, Racine, WI (US); Jessica L. Korpela, Milwaukee, WI (US); John J. Jauquet, Milwaukee, WI (US); Andrew Wilber, Franklin, WI (US); Matthew R. Ericsson, Lyndhurst, OH (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 451 days.

(21) Appl. No.: 14/752,338

(22) Filed: Jun. 26, 2015

(65) Prior Publication Data
US 2016/0285959 A1 Sep. 29, 2016

Related U.S. Application Data

(60) Provisional application No. 62/139,182, filed on Mar. 27, 2015.

(51) Int. Cl.
*H04L 29/08* (2006.01)
(52) U.S. Cl.
CPC .................................. *H04L 67/10* (2013.01)

(58) Field of Classification Search
CPC ............ G05B 19/4183; G05B 23/0283; G06Q 10/06; G06Q 50/04
See application file for complete search history.

(56) References Cited

U.S. PATENT DOCUMENTS

| | | | | |
|---|---|---|---|---|
| 2010/0082770 | A1* | 4/2010 | Baier | G05B 19/4063 709/218 |
| 2010/0256795 | A1* | 10/2010 | McLaughlin | G05B 19/4183 700/110 |

(Continued)

FOREIGN PATENT DOCUMENTS

| | | |
|---|---|---|
| EP | 2801939 A1 | 11/2014 |
| GB | 2513238 A | 10/2014 |

(Continued)

OTHER PUBLICATIONS

Extended European Search Report for EP Application No. 16162114 dated Sep. 2, 2016; 8 Pages.

*Primary Examiner* — Philip J Chea
*Assistant Examiner* — Mohammed Ahmed
(74) *Attorney, Agent, or Firm* — Fletcher Yoder, P.C.

(57) ABSTRACT

A system may include an industrial automation device, a computing device configured to receive a first set of data associated with the industrial automation device, and a cloud-computing system. The cloud-computing system may receive the first set of data from the computing device, identify a second set of data associated with the industrial automation device based on the first set of data, and send the second set of data to the computing device when the second set of data is relevant to the first set of data.

20 Claims, 7 Drawing Sheets

(56) References Cited

U.S. PATENT DOCUMENTS

| | | | |
|---|---|---|---|
| 2013/0124465 A1* | 5/2013 | Pingel | G06F 3/0604 707/610 |
| 2013/0158678 A1 | 6/2013 | Fantana et al. | |
| 2013/0212214 A1* | 8/2013 | Lawson | G06Q 10/06315 709/217 |
| 2013/0212420 A1* | 8/2013 | Lawson | G05B 19/4185 713/400 |
| 2014/0047064 A1* | 2/2014 | Maturana | H04L 67/125 709/217 |
| 2014/0047107 A1* | 2/2014 | Maturana | H04L 43/04 709/224 |

FOREIGN PATENT DOCUMENTS

| | | | |
|---|---|---|---|
| WO | 2013170871 A1 | 11/2013 | |
| WO | 2013170875 A1 | 11/2013 | |

* cited by examiner

SYSTEMS AND METHODS FOR EXCHANGING INFORMATION BETWEEN DEVICES IN AN INDUSTRIAL AUTOMATION ENVIRONMENT

CROSS REFERENCE TO RELATED APPLICATIONS

This application claims priority from and the benefit of U.S. Provisional Application Ser. No. 62/139,182, entitled "Systems and Methods for Exchanging Information Between Devices in an Industrial Automation Environment," filed Mar. 27, 2015, which is hereby incorporated by reference in its entirety.

BACKGROUND

The present disclosure relates generally to a communication architecture that enables devices in an industrial automation system to share information with each other and thus perform their respective operations more efficiently.

BRIEF DESCRIPTION

Generally, the present disclosure discusses numerous concepts regarding how devices in an industrial automation environment may exchange information with each other and use this shared information to assist users in the industrial automation environment to manage the operations and maintenance of the devices. In one embodiment, the devices in the industrial automation system may include a communication architecture that is structured according to a tri-partite paradigm that facilitates communications between a device, a computing device, and a cloud-based computing system. The information shared within this tri-partite structure may enable machines to operate more efficiently, users to perform their tasks more efficiently, and generally provide for improved operations of an industrial automation system.

In one embodiment, a system may include an industrial automation device, a computing device configured to receive a first set of data associated with the industrial automation device, and a cloud-computing system. The cloud-computing system may receive the first set of data from the computing device, identify a second set of data associated with the industrial automation device based on the first set of data, and send the second set of data to the computing device when the second set of data is relevant to the first set of data.

In another embodiment, a method may include receiving, via a cloud-computing device, a first set of data from a computing device, wherein the first set of data comprises a first location of the computing device. The method may then include receiving, via the cloud-computing device, a second set of data comprising a second location associated with an industrial automation device. The method may then include identifying, via the cloud-computing device, a third set of data based on a relationship between the first set of data and the second set of data. Afterwards, the method may include sending, via the cloud-computing device, the third set of data to the computing device.

In yet another embodiment, a non-transitory computer-readable medium comprising computer-executable instructions when executed by a processor are configured to receive a first set of data from a computing device, receive a second set of data from an industrial automation device, identify a third set of data that may be of interest to a user of the computing device based on the first set of data and the second set of data, and send the third set of data to the computing device.

DRAWINGS

These and other features, aspects, and advantages of the present invention will become better understood when the following detailed description is read with reference to the accompanying drawings in which like characters represent like parts throughout the drawings, wherein.

Figure 2:
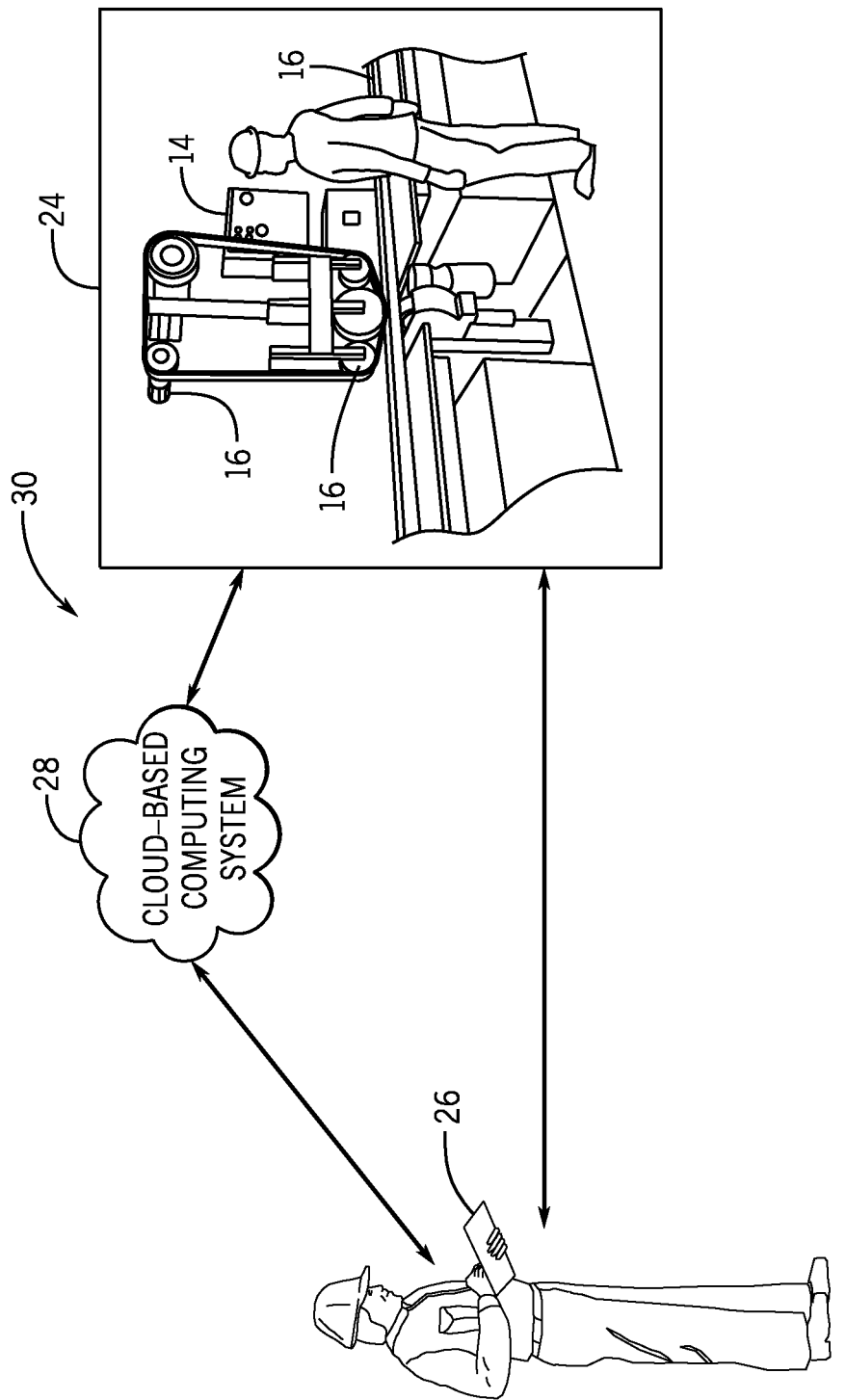
FIG. 2 is a schematic representation of a communication network that enables devices to communicate with each other within an industrial application, in accordance with embodiments presented herein.
Figure 6:
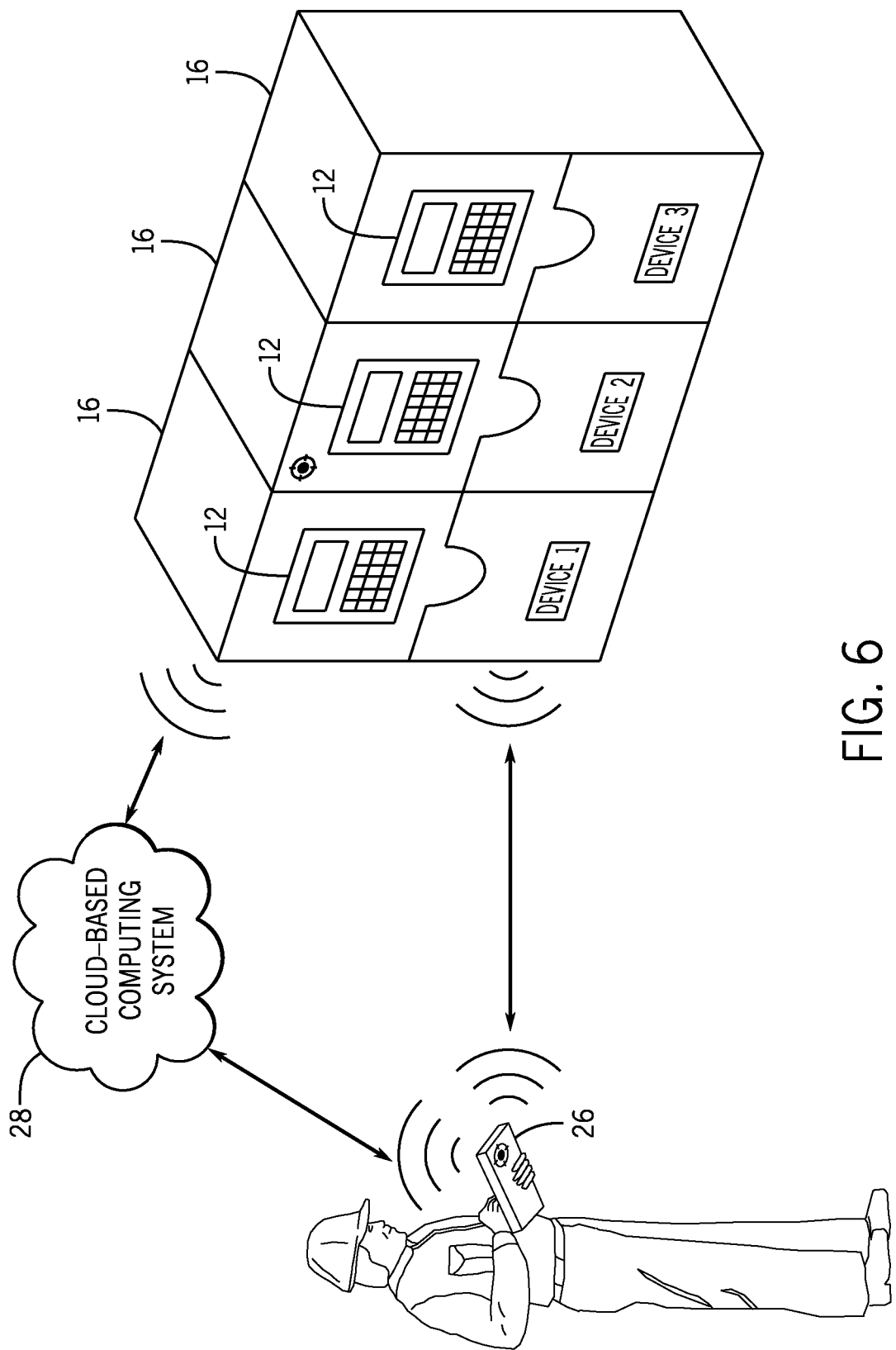
Figure 7:
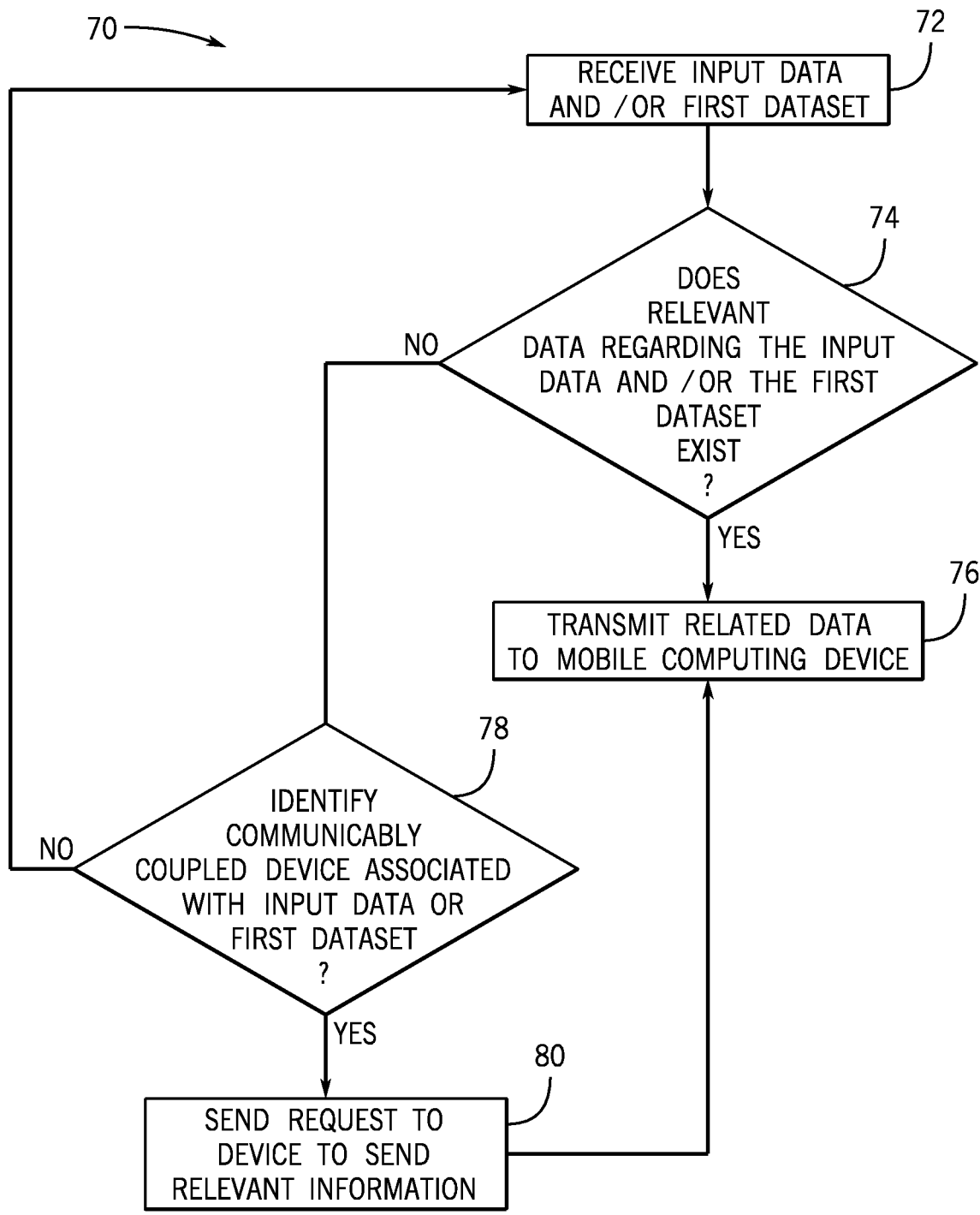

FIG. 6 is a schematic representation of communication interactions between a computing device, a cloud-based computing system, and example industrial automation equipment using the communication network of FIG. 2, in accordance with an embodiment presented herein; and FIG. 7 is a flowchart of a method employed by a cloud-based computing system for transmitting information via the communication network of FIG. 2, in accordance with an embodiment presented herein.

DETAILED DESCRIPTION

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Embodiments of the present disclosure are generally directed towards a tri-partite paradigm or communication network between at least three devices that enables information regarding an industrial automation system to be exchanged between one or more devices of the system more efficiently. The devices of the communication network may include, in one example, a computing device, automation equipment or machinery operating in an industrial automation system, and a cloud-based computing system communicatively coupled to the computing device and the equipment in the industrial automation system. In one embodiment, this tri-partite paradigm may involve a software application operating on a computing device, such that the software application may be used to monitor, control, access, or view automation equipment in an industrial automation system. In any case, the information collected by the computing device and the automation equipment in the industrial automation system may be transmitted to the cloud-based computing system, such that the cloud-based computing system may analyze the information or alert other devices in the industrial automation system of relevant information. As such, the cloud-based computing system may coordinate the exchange of information between various devices associated with the industrial automation system, such that various tasks and operations of the industrial automation system may be performed more efficiently.

Figure 1:
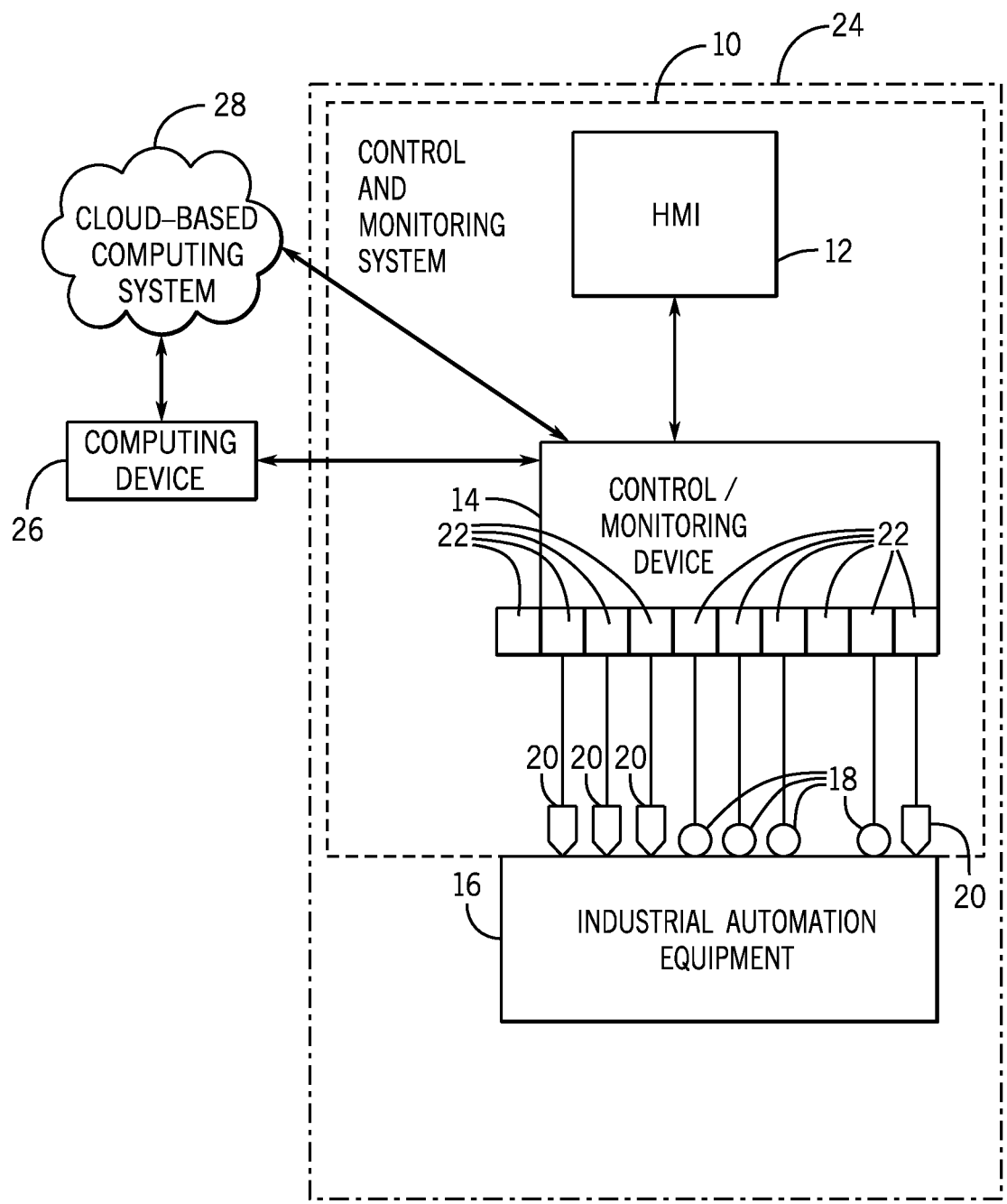
FIG. 1 is a diagrammatical representation of an exemplary control and monitoring system, in accordance with embodiments presented herein.

FIG. 1 is a diagrammatical representation of an exemplary control and monitoring system 10, in accordance with embodiments presented herein. In FIG. 1, the control and monitoring system 10 is illustrated as including a human machine interface (HMI) 12 and a control/monitoring device or automation controller 14 adapted to interface with devices that may monitor and control various types of industrial automation equipment 16. It should be noted that such an interface in accordance with embodiments of the present techniques may be facilitated by the use of certain network strategies. Indeed, an industry standard network may be employed, such as DeviceNet, to enable data transfer. Such networks permit the exchange of data in accordance with a predefined protocol, and may provide power for operation of networked elements.

The industrial automation equipment 16 may take many forms and include devices for accomplishing many different and varied purposes. For example, the industrial automation equipment 16 may include machinery used to perform various operations in a compressor station, an oil refinery, a batch operation for making food items, a mechanized assembly line, and so forth. Accordingly, the industrial automation equipment 16 may comprise a variety of operational components, such as electric motors, valves, actuators, temperature elements, pressure sensors, or a myriad of machinery or devices used for manufacturing, processing, material handling, and other applications.

Additionally, the industrial automation equipment 16 may include various types of equipment that may be used to perform the various operations that may be part of an industrial application. For instance, the industrial automation equipment 16 may include electrical equipment, hydraulic equipment, compressed air equipment, steam equipment, mechanical tools, protective equipment, refrigeration equipment, power lines, hydraulic lines, steam lines, and the like. Some example types of equipment may include mixers, machine conveyors, tanks, skids, specialized original equipment manufacturer machines, and the like. In addition to the equipment described above, the industrial automation equipment 16 may also include controllers, input/output (I/O) modules, motor control centers, motors, human machine interfaces (HMIs), operator interfaces, contactors, starters, sensors 18, actuators 20, drives, relays, protection devices, switchgear, compressors, sensor, actuator, firewall, network switches (e.g., Ethernet switches, modular-managed, fixed-managed, service-router, industrial, unmanaged, etc.) and the like.

In certain embodiments, one or more properties of the industrial automation equipment 16 may be monitored and controlled by certain equipment for regulating control variables used to operate the industrial automation equipment 16. For example, sensors 18 and actuators 20 may monitor various properties of the industrial automation equipment 16 and may adjust operations of the industrial automation equipment 16, respectively.

In some cases, the industrial automation equipment 16 may be associated with devices used by other equipment. For instance, scanners, gauges, valves, flow meters, and the like may be disposed on industrial automation equipment 16. Here, the industrial automation equipment 16 may receive data from the associated devices and use the data to perform their respective operations more efficiently. For example, a controller (e.g., control/monitoring device 14) of a motor drive may receive data regarding a temperature of a connected motor and may adjust operations of the motor drive based on the data.

In certain embodiments, the industrial automation equipment 16 may include a computing device and/or a communication component that enables the industrial equipment 16 to communicate data between each other and other devices. The communication component may include a network interface that may enable the industrial automation equipment 16 to communicate via various protocols such as EtherNet/IP, ControlNet, DeviceNet, or any other industrial communication network protocol. Alternatively, the communication component may enable the industrial automation equipment 16 to communicate via various wired or wireless communication protocols, such as Wi-Fi, mobile telecommunications technology (e.g., 2G, 3G, 4G, LTE), Bluetooth®, near-field communications technology, and the like.

The sensors 18 may be any number of devices adapted to provide information regarding process conditions. The actuators 20 may include any number of devices adapted to perform a mechanical action in response to a signal from a controller (e.g., the automation controller 14). The sensors 18 and actuators 20 may be utilized to operate the industrial automation equipment 16. Indeed, they may be utilized within process loops that are monitored and controlled by the control/monitoring device 14 and/or the HMI 12. Such a process loop may be activated based on process inputs (e.g., input from a sensor 18) or direct operator input received through the HMI 12. As illustrated, the sensors 18 and actuators 20 are in communication with the control/monitoring device 14. Further, the sensors 18 and actuators 20 may be assigned a particular address in the control/monitoring device 14 and receive power from the control/monitoring device 14 or attached modules.

Input/output (I/O) modules 22 may be added or removed from the control and monitoring system 10 via expansion slots, bays or other suitable mechanisms. In certain embodiments, the I/O modules 22 may be included to add functionality to the control/monitoring device 14, or to accommodate additional process features. For instance, the I/O modules 22 may communicate with new sensors 18 or actuators 20 added to monitor and control the industrial automation equipment 16. It should be noted that the I/O modules 22 may communicate directly to sensors 18 or actuators 20 through hardwired connections or may communicate through wired or wireless sensor networks, such as Hart or IOLink.

Generally, the I/O modules 22 serve as an electrical interface to the control/monitoring device 14 and may be located proximate or remote from the control/monitoring device 14, including remote network interfaces to associated systems. In such embodiments, data may be communicated with remote modules over a common communication link, or network, wherein modules on the network communicate via a standard communications protocol. Many industrial controllers can communicate via network technologies such as Ethernet (e.g., IEEE802.3, TCP/IP, UDP, EtherNet/IP, and so forth), ControlNet, DeviceNet or other network protocols (Foundation Fieldbus (H1 and Fast Ethernet) Modbus TCP, Profibus) and also communicate to higher level computing systems.

In the illustrated embodiment, several of the I/O modules 22 are configured to transfer input and output signals between the control/monitoring device 14 and the industrial automation equipment 16. As illustrated, the sensors 18 and actuators 20 may communicate with the control/monitoring device 14 via one or more of the I/O modules 22 coupled to the control/monitoring device 14.

In certain embodiments, the control/monitoring system 10 (e.g., the HMI 12, the control/monitoring device 14, the sensors 18, the actuators 20, the I/O modules 22) and the industrial automation equipment 16 may make up an industrial application 24. The industrial application 24 may involve any type of industrial process or system used to manufacture, produce, process, or package various types of items. For example, the industrial applications 24 may include industries such as material handling, packaging industries, manufacturing, processing, batch processing, and the like.

In certain embodiments, the control/monitoring device 14 may be communicatively coupled to a computing device 26 and a cloud-based computing system 28. In this network, input and output signals generated from the control/monitoring device 14 may be communicated between the computing device 26 and the cloud-based computing system 28.

FIG. 2 is a schematic representation of a communication network 30 that enables devices to communicate with each other within an industrial application, in accordance with embodiments presented herein. As such, the communication network 30 enables devices that are part of the industrial application 24 to communicate with each other and with other devices that are not part of the industrial application 24. As mentioned above, the industrial application 24 may be in the material handling, packaging industries, manufacturing, processing, batch processing, or any technical field that employs the use of the industrial automation equipment 16.

With the foregoing in mind, in one embodiment, data acquired by the industrial automation equipment 16 may be transmitted to a computing device 26. The computing device 26 may be a computing device that may include communication abilities, processing abilities, and the like. For example, the computing device 26 may be any general computing device that may monitor, control, and/or operate one or more of the industrial automation equipment 16. As such, the computing device 26 may be a laptop computer, a tablet computer, a mobile phone device computing device, a general personal computer, a wearable computing device, or the like. Additional details regarding the computing device 26 will be discussed below with reference to FIG. 3.

In addition to communicating with the industrial automation equipment 16, the computing device 26 may also communicate with the cloud-based computing system 28. The cloud-based computing system 28 may be a cloud-accessible platform that may include one or more servers, one or more computing devices (e.g., general purpose computers), and the like. In any case, the cloud-based computing system 28 may include a number of computers that may be connected through a real-time communication network, such as the Internet, Ethernet, EtherNet/IP, ControlNet, or the like, such that the multiple computers may operate together as a single entity. The real-time communication network may include any network that enables various devices to communicate with each other at near real-time or such that data is communicated with each other at near instantaneous speeds. In one embodiment, the cloud-based computing system 28 may be capable of communicating with the industrial automation equipment 16 and the computing device 26. As such, the cloud-based computing system 28 may be capable of wired or wireless communication between the industrial automation equipment 16 and the computing device 26. In one embodiment, the cloud-based computing system 28 may be accessible via the Internet or some other network.

After establishing a communication connection between the computing device 26 and the industrial automation equipment 16 (e.g., via an associated control/monitoring device 14 or computing device of the industrial automation equipment 16), the cloud-based computing system 28 may receive data acquired by the computing device 26 and the industrial automation equipment 16. After receiving this data, in one embodiment, the cloud-based computing system 28 may perform large-scale data analysis operations on the data, such that the operations may be distributed over the computers that make up the cloud-based computing system 28.

In another embodiment, the cloud-based computing system 28 may forward acquired data or analyzed data to different computing devices, various industrial automation equipment, or the like. As such, the cloud-based computing system 28 may maintain a communication connection with various industrial automation equipment 16, computing devices 26, and the like. Additional details regarding the cloud-based computing system 28 will be discussed below with reference to FIG. 4.

Figure 3:
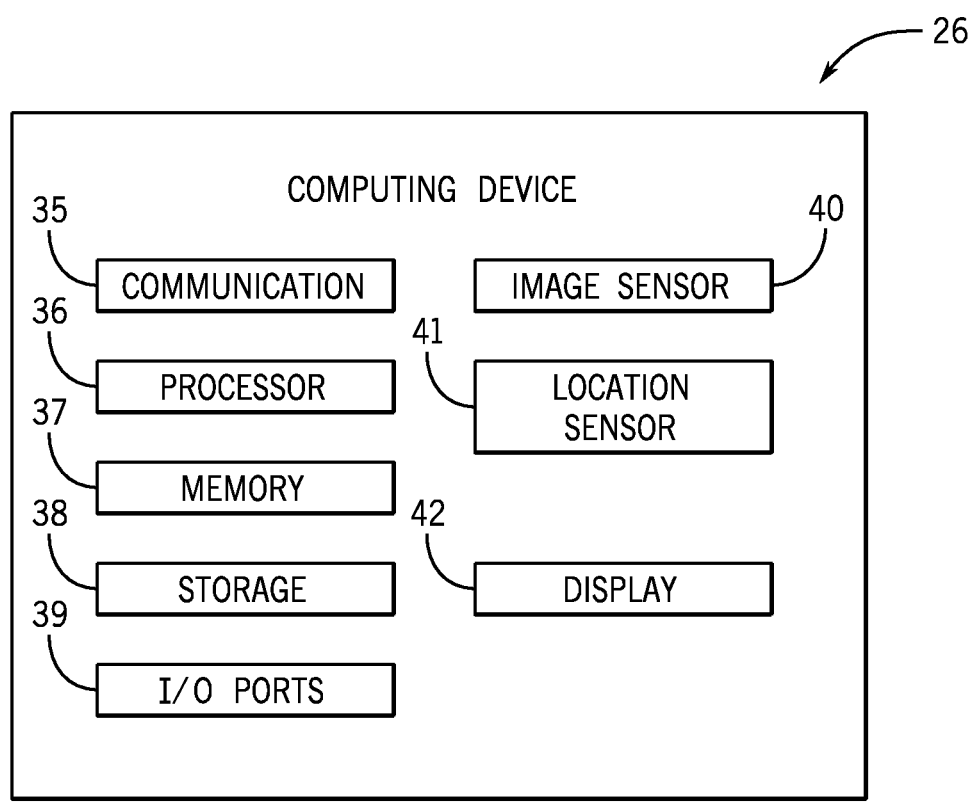
FIG. 3 is a block diagram of example components within a computing device that is part of the communication network of FIG. 2, in accordance with embodiments presented herein.

FIG. 3 is a block diagram of example components within the computing device 26 that is part of the communication network 30, in accordance with embodiments presented herein. For example, the computing device 26 may include a communication component 35, a processor 36, a memory 37, a storage 38, input/output (I/O) ports 39, an image sensor 40 (e.g., a camera), a location sensor 41, a input/display 42, additional sensors (e.g., vibration sensors, temperature sensors) and the like. The communication component 35 may be a wireless or wired communication component that may facilitate communication between the industrial automation equipment 16, the cloud-based computing system 28, and other communication capable devices (e.g., apparatuses described below).

The processor 36 may be any type of computer processor or microprocessor capable of executing computer-executable code. The processor 36 may also include multiple processors that may perform the operations described below. The memory 37 and the storage 38 may be any suitable articles of manufacture that can serve as media to store processor-executable code, data, or the like. These articles of manufacture may represent computer-readable media (e.g., any suitable form of memory or storage) that may store the processor-executable code used by the processor 36 to perform the presently disclosed techniques. Generally, the processor 36 may execute software applications that include programs that enable a user to track and/or monitor operations of the industrial automation equipment 16 via a local or remote communication link. That is, the software applications may communicate with the control/monitoring device 14 and gather information associated with the industrial automation equipment 16 as determined by the control/ monitoring device 14, via sensors disposed on the industrial automation equipment 16, and the like.

The memory 37 and the storage 38 may also be used to store the data, analysis of the data, the software applications, and the like. The memory 37 and the storage 38 may represent non-transitory computer-readable media (e.g., any suitable form of memory or storage) that may store the processor-executable code used by the processor 36 to perform various techniques described herein. It should be noted that non-transitory merely indicates that the media is tangible and not a signal.

In one embodiment, the memory 37 and/or storage 38 may include a software application that may be executed by the processor 36 and may be used to monitor, control, access, or view one of the industrial automation equipment 16. As such, the computing device 26 may communicatively couple to industrial automation equipment 16 or to a respective computing device of the industrial automation equipment 16 via a direct connection between the devices or via the cloud-based computing system 28.

The I/O ports 39 may be interfaces that may couple to other peripheral components such as input devices (e.g., keyboard, mouse), sensors, input/output (I/O) modules, and the like. I/O modules may enable the computing device 26 to communicate with the industrial automation equipment 16 or other devices in the industrial automation system via the I/O modules.

The image sensor 40 may include any image acquisition circuitry such as a digital camera capable of acquiring digital images, digital videos, or the like. The location sensor 41 may include circuitry designed to determine a physical location of the computing device 26. In one embodiment, the location sensor 41 may include a global positioning system (GPS) sensor that acquires GPS coordinates for the computing device 26. In another embodiment, the location sensor 41 may include other circuitry such as a radio wave transmitter, an infrared sensor, and the like that may acquire data that may be used to determine a location of the computing device 26 with respect to other industrial automation equipment 16 or other fixtures in the industrial automation system. In certain embodiments, the computing device 26 may also include various other sensors that may provide additional data related to an environment in which the computing device 26 exists. For instance, the other sensors may include an accelerometer, a gas (e.g., smoke, carbon monoxide) sensor, or the like.

The display 42 may depict visualizations associated with software or executable code being processed by the processor 36. In one embodiment, the display 42 may be a touch display capable of receiving inputs (e.g., parameter data for operating the industrial automation equipment 16) from a user of the computing device 26. As such, the display 42 may serve as a user interface to communicate with the industrial automation equipment 16. The display 42 may be used to display a graphical user interface (GUI) for operating the industrial automation equipment 16, for tracking the maintenance of the industrial automation equipment 16, performing various procedures (e.g., lockout tagout, placing device offline, replacing component, servicing device) for the industrial automation equipment 16, and the like. The display 42 may be any suitable type of display, such as a liquid crystal display (LCD), plasma display, or an organic light emitting diode (OLED) display, for example. Additionally, in one embodiment, the display 42 may be provided in conjunction with a touch-sensitive mechanism (e.g., a touch screen) that may function as part of a control interface for the industrial automation equipment 16 or for a number of pieces of industrial automation equipment in the industrial application 24, to control the general operations of the industrial application 24. In some embodiments, the operator interface may be characterized as the HMI 12, a human-interface machine, or the like.

Although the components described above have been discussed with regard to the computing device 26, it should be noted that similar components may make up the control/monitoring device 14. Moreover, the computing device 26 may also be part of the industrial automation equipment 16, and thus may monitor and control certain operations of the industrial automation equipment 16. Further, it should be noted that the listed components are provided as example components and the embodiments described herein are not to be limited to the components described with reference to FIG. 3.

Figure 4:
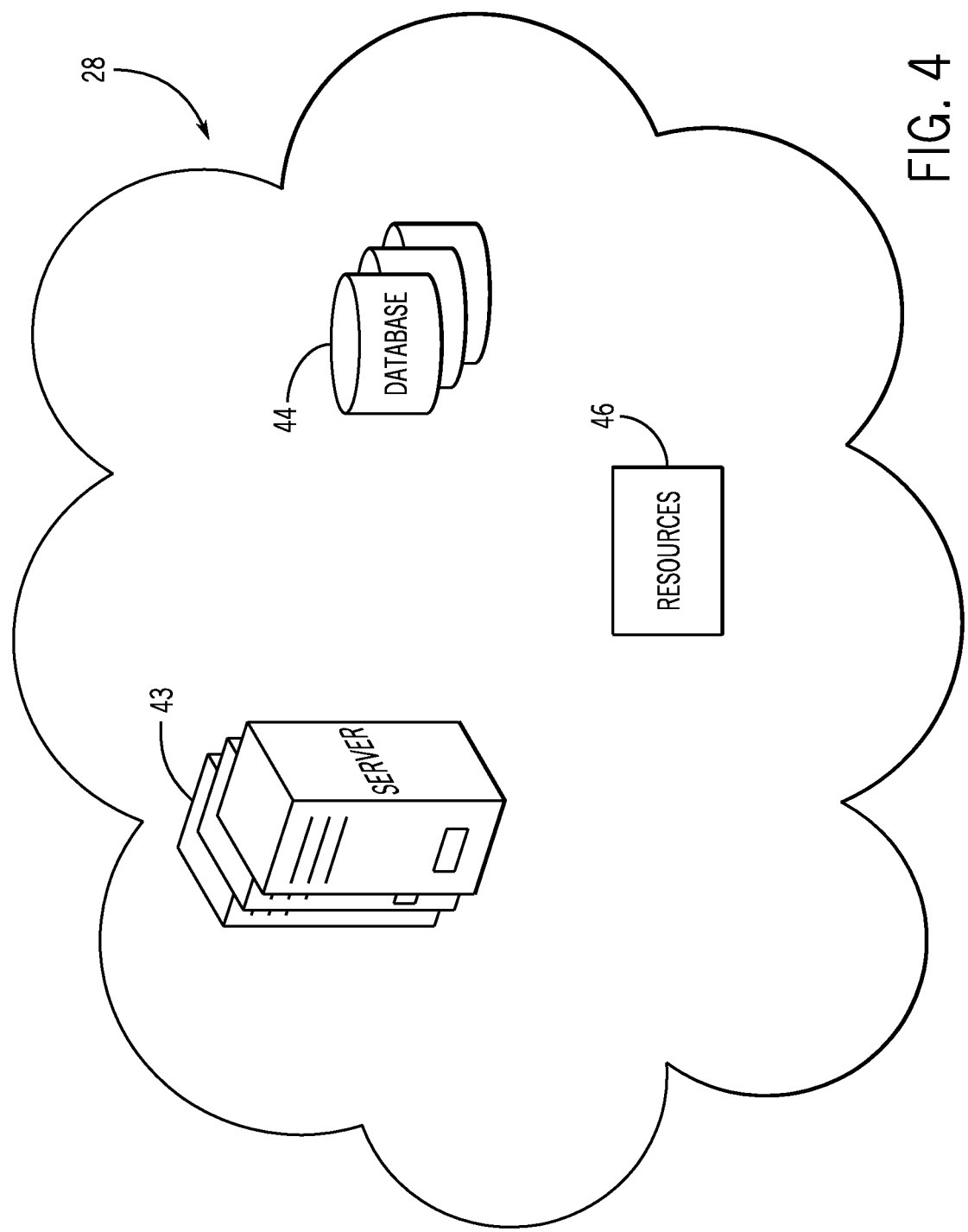
FIG. 4 is a block diagram of example components within a cloud-based computing system of the communication network of FIG. 2, in accordance with embodiments presented herein.

FIG. 4 is a block diagram of example components within the cloud-based computing system 28 of the communication network 30 of FIG. 2, in accordance with embodiments presented herein. As mentioned above, the cloud-based computing system 28 may include a number of computing devices, such as servers 43 that may be communicatively coupled to each other and may distribute various tasks between each other to perform the tasks more efficiently. In certain embodiments, each server 43 may include the example components described above as part of the computing device 26 in FIG. 3.

The cloud-based computing system 28 may also have access to a number of databases 44. The databases 44 may be related to various aspects of the industrial automation system, the industrial automation equipment 16, the computing device 26, operators of the computing device 26 or the industrial automation equipment 16, or the like. For example, the databases 44 may include information regarding procedures for operating and/or maintaining the industrial automation equipment 16. The procedures, as such, may include steps to perform, tools to use, personal protective equipment to wear, and the like with regard to the operations being performed.

The databases 44 may also include information regarding various regulations related to how the industrial automation equipment 16 should be maintained or operated. Additionally, the regulations may be related to how maintenance operations should be documented by the user of the computing device 26. The databases 44 may also include data related to warranty information for the industrial automation equipment 16, service contact information related to the industrial automation equipment 16, manuals for operating the industrial automation equipment 16, and other information that may be useful to an operator of the industrial automation equipment 16.

In certain embodiments, the cloud-based computing system 28 may also include access to various resources 46. The resources 46 may be a database or collection of published documents or webpages that may be related to the industrial automation equipment 16. As such, the resources 46 may be accessed by the cloud-based computing system 28 available via the Internet or other communication networks. The cloud-based computing system 28 may search or consult the resources 46 to acquire data related to the industrial automation equipment 16. For instance, the resources 46 may provide information regarding product recalls or safety concerns related to the industrial automation equipment 16, weather advisory notices for the industrial automation system, and the like. Additionally, the resources 46 may include hardware, software or firmware updates, software patches, vulnerability patches, certificates, and the like.

Figure 5:
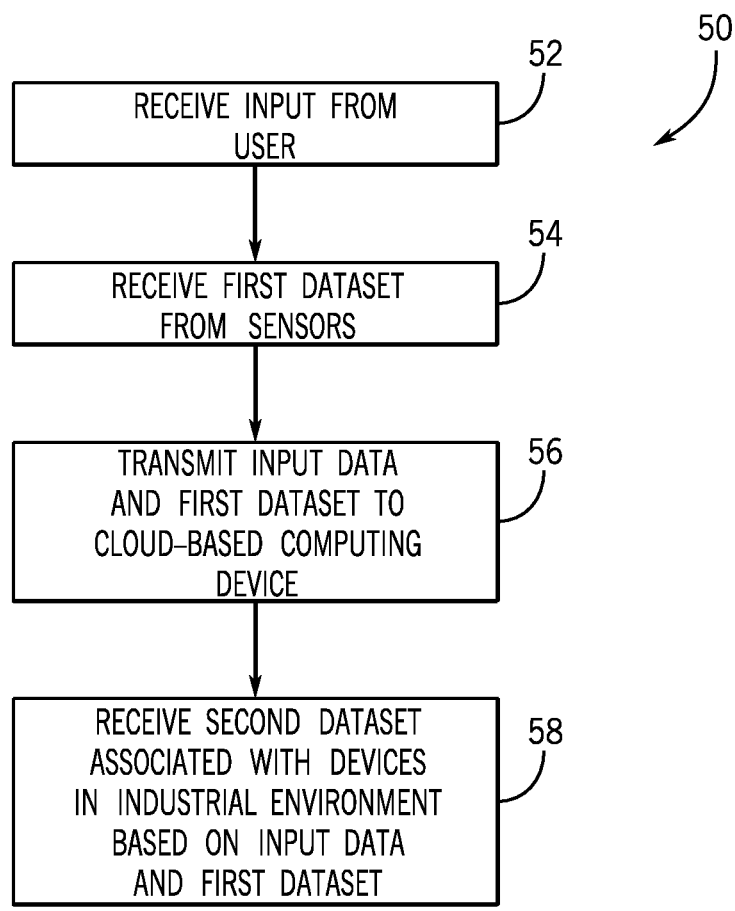
FIG. 5 is a flow chart of a method employed by a computing device for receiving information via the communication network of FIG. 2, in accordance with an embodiment presented herein.

FIG. 5 is a flow chart of a method 50 employed by the computing device 26 for receiving information via the communication network 30 of FIG. 2, in accordance with an embodiment presented herein. Although the following description of the method 50 is described with reference to the processor 36 of the computing device 26, it should be noted that the method 50 may be performed by other processors disposed on other devices that may be capable of communicating with the cloud-based computing system 28, the industrial automation equipment 16, or other components associated with the industrial application 24. Additionally, although the following method 50 describes a number of operations that may be performed, it should be noted that the method 50 may be performed in a variety of suitable orders and all of the operations may not be performed.

Referring now to FIG. 5, at block 52, the processor 36 may receive some input data from a user of the computing device 26. The input data may include an indication of a particular industrial automation equipment 16 that the user intends to perform examine or inspect. The input data may also include a request to receive or open an inspection report for a particular industrial automation equipment 16 that the user intends to examine. The input data may also include parameter data that involves data that details certain properties (e.g., temperature, pressure, speed) of the industrial automation equipment 16.

For example, FIG. 6 is a schematic representation of communication interactions between the computing device 26, the cloud-based computing system 28, and the industrial automation equipment 16 (e.g., via the control/monitoring device 14) using the communication network 30. As illustrated in FIG. 6, the user may provide an input to the computing device 26 that relates to "Device 2." As such, the input data may include information that identifies a particular industrial automation equipment 16.

For example, the input data may include a barcode that may have been scanned by the computing device 26, a Quick Response (QR) code that may be acquired via an image sensor of the computing device 26, electronic identification acquired via NFC communication, or the like. The acquired information may reveal a location (e.g., GPS coordinates) of the computing device 26 and the respective industrial automation equipment 16. In addition to the examples provided above, the input data may also include process variables, settings, configurations, hardware revisions, software revisions, firmware revisions, diagnostics and error counters, and the like.

At block 54, the processor 36 may receive a first dataset from sensors disposed on the computing device 26. For example, the processor 36 may acquire location information related to the computing device 26 acquired by the location sensor 41. After receiving the input data from the user and the first dataset, the processor 36 may transmit the input data and the first dataset to the cloud-based computing system 28. The cloud-based computing system 28 may then, in turn, analyze the input data and the first dataset in view of the data accessible to the cloud-based computing system 28.

Referring again to the example of FIG. 6, in one embodiment, the cloud-based computing system 28 may receive input data indicating that the user intended to perform operations or maintenance on Device 2 of the industrial automation system. In addition to the input data, the cloud-based computing system 28 may receive location information regarding the location of the computing device 26.

Using the data received from the computing device 26, the cloud-based computing system 28 may identify other datasets that may be of interest to the user of the computing device 26. For example, upon receiving information indicating the input data related to Device 2, the cloud-based computing system 28 may determine whether it has data related to the Device 2. In one embodiment, the cloud-based computing system 28 may determine that Device 2 includes a location sensor and may thus receive location data associated with Device 2 from the device itself. As such, the cloud-based computing system 28 may send a request to the Device 2 for the data related to Device 2. In certain embodiments, the Device 2 may send the requested data to the cloud-based computing system 28 or may send the requested data directly to the computing device 26.

In another example, after determining that data from the industrial automation equipment 16 may be of interest to the user of the computing device 26, the cloud-based computing system 28 may forward raw data readings from a number of sensors communicatively coupled to the industrial automation equipment 16 to the computing device 26.

As such, after the processor 36 transmits the input data and the first dataset at block 56, at block 58, the processor 36 may receive a second dataset based on the input data and/or the first dataset. That is, the processor 36 may receive data related to information provided in the input data and/or the first dataset from the cloud-based computing system 28.

Upon receiving the second dataset, the processor 36 may display the second dataset on the display 42, analyze the second dataset with respect to the tasks being performed by the processor 36, or the like. For instance, referring again to the example provided above, if the second dataset includes location information regarding the location of Device 2, the processor 36 may compare the location data of the computing device 26 with the location data of Device 2 and provide directions for the user to travel to reach Device 2.

In certain embodiments, after receiving the second dataset, the processor 36 may, at a later time, receive the same input as described above with respect to block 52 or the same first dataset as described above with respect block 54. Since the data related to the input or first dataset has already been received as described above with regard to the method 50, the processor 36 may forego consulting the cloud-based computing system 28 and identify the second dataset stored in a storage component accessible to the processor 36. The processor 36 may then display the second dataset, use the second dataset for certain data analysis, or the like.

With the foregoing in mind, FIG. 7 is a flow chart of a method 80 that may be employed by the cloud-based computing system 28 for transmitting information via the communication network 10. As mentioned above with regard to the method 50 of FIG. 6, although the following description of the method 80 is described as being performed by the cloud-based computing system 28, it should be understood that the method 80 may be performed by a number of suitable computing devices. Additionally, it should be noted that the blocks illustrated in the method 80 is presented as an example and are not limited to the depicted order.

Referring now to FIG. 7, at block 72, the cloud-based computing system 28 may receive input data associated with information provided to a software application or the like. Referring to the example presented above in FIG. 6, the input data may include information associated with a task being performed by a user of the computing device 26. In addition to receiving input data, the cloud-based computing system 28 may receive a first dataset that may include information associated with the computing device 26, sensors disposed on the computing device 26, or the like.

At block 74, the cloud-based computing system 28 may determine whether data associated with the input data and/or the first dataset is accessible to the cloud-based computing system 28. That is, the cloud-based computing system 28 may determine whether data that corresponds to the input data and/or the first dataset exist on the servers 43, the databases 44, the resources 46, and the like. For example, if the input data corresponds to an inspection report to be performed on the Device 2, the cloud-based computing system 28 may identify a previously submitted inspection report for the Device 2 from the database 44.

In certain embodiments, the cloud-based computing system 28 may analyze the input data and the first dataset with respect to additional data that may be accessible to the cloud-based computing system 28. For example, the cloud-based computing system 28 may receive input data indicating that the Device 2 will be serviced at a particular day and time. Upon receiving this data, the cloud-based computing system 28 may review the resources 46 and determine whether the weather will be favorable for servicing the Device 2 at the proposed day and time. If the cloud-based computing system 28 determines that the weather may not be favorable for servicing the Device 2, the cloud-based computing system 28 may generate a message that may be sent to the computing device 26 at a later time.

In another embodiment, the cloud-based computing system 28 may receive the first set of data from the computing device 26 and may receive a second dataset from a respective industrial automation equipment 16. Upon receiving the two datasets, the cloud-based computing system 28 may identify a third dataset that may be of interest to the user of the computing device 26 based on a relationship between the received datasets. For instance, the cloud-based computing system 28 may receive the first set of data indicating a location of the computing device 26 from the computing device 26 and may receive a second dataset indicating a location of a respective industrial automation equipment 16 from the respective industrial automation equipment 16. The cloud-based computing system 28 may then determine whether the first location is within a range or distance from the second location. If the two locations are within the range, the cloud-based computing system 28 may identify maintenance or alarm information regarding the industrial automation component and send a request (e.g., the third dataset) to the computing device 26 requesting the user to attend to the respective industrial automation equipment 16.

In any case, if the cloud-based computing system 28 identifies data that may be associated with the input data or the first dataset, the cloud-based computing system 28 may proceed to block 76 and transmit the related data or the second dataset to the computing device 26. If, however the cloud-based computing system 28 does not identify data that relates to the input data or the first dataset, the cloud-based computing system 28 may proceed to block 78.

At block 78, the cloud-based computing system 28 may determine whether a device related to the input data or the first dataset is communicably coupled to the cloud-based computing system 28. For example, if the input data indicates that Device 2 is being inspected, the cloud-based computing system 28 may determine whether Device 2 is communicatively coupled to the cloud-based computing system 28 or whether a communication link can be established between the cloud-based computing system 28 and the Device 2.

If a device is identified, at block 80, the cloud-based computing system 28 may send a request to the identified device to send relevant information to the cloud-based computing system 28. Upon receiving the relevant information (e.g., the second dataset), the cloud-based computing system 28 may proceed to block 76 and transmit the related data to the computing device 26. In one embodiment, at block 80, request sent by the cloud-based computing system 28 may indicate that the identified device transmits the relevant data to the computing device 26.

Returning to block 78, if the cloud-based computing system 28 does not identify a device that is communicatively coupled to the cloud-based computing system 28, the cloud-based computing system 28 may return to block 72 and continue receiving data from the computing device 26.

It should be noted that the method 50 and the method 70 are performed using the processor 36 that is part of the computing device 26 and the cloud-based computing system 28. The computing device 26 and the cloud-based computing system 28 are configured to execute software applications that enable each device to with the industrial automation equipment 16. As such, the computing device 26 and the cloud-based computing system 28 are tied to particular machines, such that a tri-partite system is created to assist in the management and operations of the industrial automation equipment 16, and thus the industrial application 24. Moreover, it should be noted that the data received by the computing device 26, the cloud-based computing system 28, the industrial automation equipment 16, or the control/monitoring device 14 may be transformed when being transmitted, analyzed, or depicted for view by a user of the respective device.

Technical effects of the embodiments described herein include coordinating the transfer of data between the computing device 26, the cloud-based computing system 28, and the industrial automation equipment 16. By efficiently sharing data between these components, operations and maintenance of the industrial application 24 may be performed more efficiently.

In the preceding specification, various embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

The invention claimed is:

1. A system, comprising:
an industrial automation device comprising a machine configured to perform one or more operations for an industrial application;
a computing device configured to receive a first set of data comprising an indication of an intention to perform maintenance on the industrial automation device and a first location associated with the computing device, wherein the first location is acquired via one or more first sensors disposed on the computing device; and
a cloud-computing system configured to:
receive the first set of data from the computing device;
determine if a second set of data is present on one or more databases of the cloud-computing system based on an identification of the industrial automation device provided by the first set of data, wherein the second set of data comprises a second location associated with the industrial automation device acquired by one or more second sensors disposed on the industrial automation device;
send a request to the industrial automation device for the second location associated with the industrial automation device in response to determining the second set of data is not present on the one or more databases;

receive the second location from the industrial automation device;

send the second location to the computing device;

identify a third set of data stored on the industrial automation device in response to determining the first location is within a distance of the second location, wherein the third set of data is filtered to comprise information associated with the maintenance to be performed on the industrial automation device; and send the third set of data to the computing device.

2. The system of claim 1, wherein the computing device is configured to:

receive the indication from the industrial automation device; and identify a third set of data based on the first set of data, wherein the third set of data was previously received from the cloud-computing system.

3. The system of claim 2, wherein the third set of data is acquired from one or more databases, one or more resources, or any combination thereof accessible to the cloud-computing system.

4. The system of claim 1, wherein the first set of data comprises an input provided into an application being executed by a processor of the computing device.

5. The system of claim 4, wherein the input comprises information indicative of an identity of the industrial automation device.

6. The system of claim 1, wherein the first set of data comprises parameter data regarding the industrial automation device.

7. The system of claim 1, wherein the industrial automation device comprises a controller, an input/output module, a motor control center, a motor, a human machine interface, an operator interface, a contactor, a starter, a sensor, a drive, a relay, a protection device, switchgear, sensor, actuator, firewall, a network switch, or a router.

8. A method, comprising:

receiving, via a cloud-computing device, a first set of data from a computing device, wherein the first set of data comprises a first location of the computing device;

receiving, via the cloud-computing device, a second set of data from an industrial automation device, wherein the industrial automation device comprises a machine configured to perform one or more operations for an industrial application, wherein the second set of data comprises a second location associated with the industrial automation device, and wherein the second set of data comprises information indicative of a request for maintenance to be performed on the industrial automation device;

identify a third set of data stored on the industrial automation device in response to determining the first location is within a distance of the second location, wherein the third set of data is filtered to comprise information associated with the maintenance to be performed on the industrial automation device, and wherein the third set of data comprises the request for maintenance to be performed on the industrial automation device; and sending, via the cloud-computing device, the third set of data to the computing device.

9. The method of claim 8, wherein the third set of data comprises maintenance information associated with the industrial automation device.

10. The method of claim 8, wherein the first set of data is acquired via one or more sensors disposed on the computing device.

11. The method of claim 8, wherein the second set of data is acquired via one or more sensors disposed on the industrial automation device.

12. The method of claim 8, wherein the first set of data is acquired by the computing device via a barcode, a Quick Response (QR) code, or an electronic identification component disposed on the industrial automation device.

13. A non-transitory computer-readable medium comprising computer-executable instructions that, when executed by one or more processors, cause the one or more processors to:

receive a first set of data from a computing device, wherein the first set of data is indicative of an intention to perform maintenance on an industrial automation device and comprises a first location associated with the computing device;

receive a second set of data from the industrial automation device, wherein the second set of data comprises a second location associated with the industrial automation device;

determine whether a third set of data associated with the industrial automation device is present on one or more databases accessible to the one or more processors in response to determining the first location is within a distance of the second location, wherein the third set of data is filtered to be a previously submitted maintenance report associated with the maintenance to be performed on the industrial automation device and wherein the third set of data comprises the request for maintenance to be performed on the industrial automation device;

send a request for the third set of data to the industrial automation device in response to determining that the third set of data is not present on the one or more databases, wherein the industrial automation device is communicatively coupled to the one or more processors, and wherein the industrial automation device comprises a machine configured to perform one or more operations for an industrial application;

receive the third set of data from the industrial automation device; and send the third set of data to the computing device.

14. The non-transitory computer-readable medium of claim 13, wherein the second set of data comprises location data associated with the industrial automation data, wherein the location data is acquired by one or more sensors disposed on the industrial automation device.

15. The non-transitory computer-readable medium of claim 13, wherein the second set of data comprises raw data acquired by one or more sensors disposed on the industrial automation device.

16. The non-transitory computer-readable medium of claim 13, wherein the computer executable instructions, when executed, cause the processors to identify a third set of data associated with the previously submitted maintenance report, wherein the third set of data is analyzed data stored on a cloud-computing system.

17. The non-transitory computer-readable medium of claim 16, wherein the third set of data is analyzed data received from a cloud-computing system.

18. The non-transitory computer-readable medium of claim 13, wherein the first set of data comprises information provided to a software application being executed by the computing device.

19. The non-transitory computer-readable medium of claim 18, wherein the information comprises an identification of the industrial automation device.

20. The method of claim 18, comprising identifying maintenance information associated with the industrial automation device in response to receiving the second set of data.

* * * * *